Feb. 22, 1955  D. HARTLAND  2,702,408
EXTRUSION OF THERMOPLASTIC MATERIALS
Filed July 12, 1951
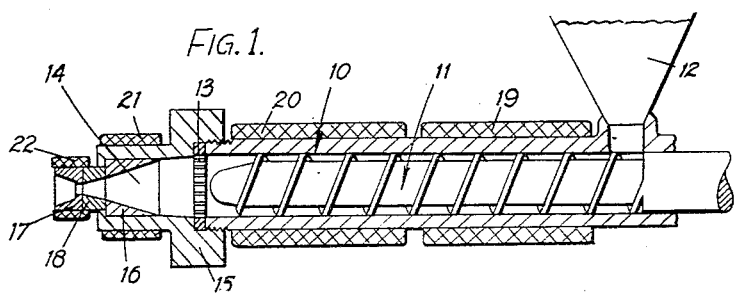
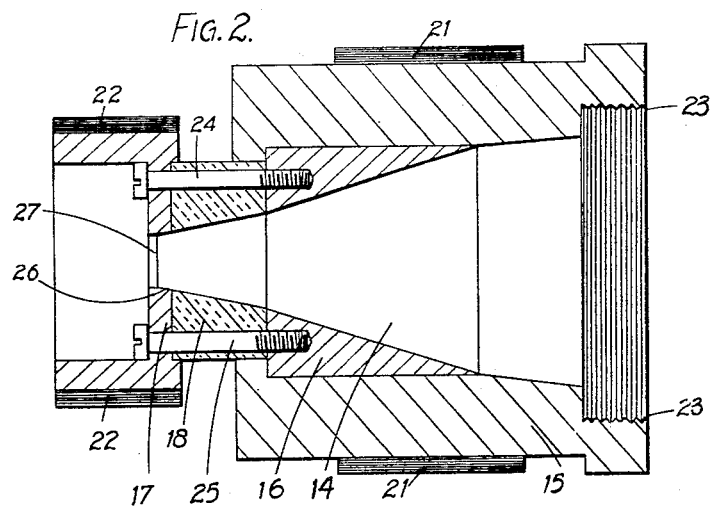
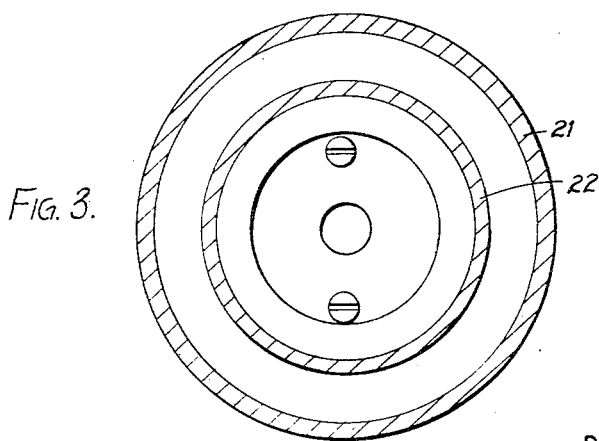
INVENTOR:
DEREK HARTLAND
BY:
D.C. Harrison
ATTORNEY:

United States Patent Office

2,702,408
Patented Feb. 22, 1955

2,702,408

EXTRUSION OF THERMOPLASTIC MATERIALS

Derek Hartland, Penn, Wolverhampton, England, assignor to Union Carbide and Carbon Corporation, a corporation of New York Application July 12, 1951, Serial No. 236,295

Claims priority, application Great Britain July 27, 1950

4 Claims. (Cl. 18—12)

This invention is for improvements in or relating to the extrusion of thermoplastic materials and has particular reference to a process and apparatus whereby the extrusion of thermoplastic material may be controlled in such a way as to obtain extruded products having predetermined surface finishes. It is applicable with particular advantage to the extrusion of heat sensitive compositions which tend to decompose on heating. Such heat sensitive compositions include compositions based on polyvinyl chloride of polyvinylidene chloride.

The extrusion of thermoplastic material is widely practised as an economic method of moulding long or continuous lengths but, up to the present the degree of gloss on the surface of the extruded product had depended primarily on the formulation of the composition, on critical control of extrusion conditions or on the provision of a polishing operation subsequent to extrusion. Factors which influence gloss and which are controlled by formulation are the flow characteristics of the material, the thermal stability of the composition and the proportion of lubricant. Highly lubricated free flowing materials can be extruded on normal extrusion machines with the formation of products having reasonable gloss which probably depends on slight surface exudation of lubricant. As a consequence, such materials give extruded products with a high initial gloss which in use is dulled as the exuded lubricant picks up dust or is rubbed off. A method of producing extruded products with more permanent gloss is by flame polishing. In this method the compound is extruded in the normal manner and the extruded product as it leaves the extruder die is passed through a flame. This operation requires careful control because at temperatures above the decomposition point, marked surface deterioration occurs. By very careful control of conditions, such as the temperature of the die and head of the extrusion machine in relation to extrusion speed, it is possible to obtain some measure of gloss but this requires the use of skilled labour. It is also possible with extrusion dies of long land lengths to obtain good gloss but only at the expense of output.

It is one object of the present invention to obtain high gloss on extruded products by an economic and easily operated method which does not involve any additional operation subsequent to extrusion. Further, specially formulated compositions are not necessary, the rigid control of extrusion conditions is not called for and speed of output is not sacrificed.

It has now been found that extruded products having high gloss can be obtained if the thermoplastic material before issuing from the extruder die is heated to a temperature which in relation to the speed of travel is sufficiently high to bring about superficial melting but insufficiently high to cause either appreciable decomposition of the plastic or substantial softening of the body of the extruded product. We have also found that by controlling the temperature of the die tip in relation to the speed of travel of the extruding aricle it is possible to obtain instead of a high gloss finish any predetermined finish from matt to glossy. In general the underlying principle is to maintain the core of the extruding product at a temperature suitable for moulding purposes and to obtain the desired surface finish by controlling the temperature of the surface layer.

According to the present invention the extrusion of a thermoplastic composition is carried out by heating the composition until it attains a plastic condition when it is extruded through a die comprising two components or two zones through which the composition successively passes, viz. (a) the body of the die where the composition is maintained at a temperature not substantially higher than is necessary for maintaining plasticity, and (b) a die tip which imparts final shape to the composition and which is adjusted to the temperature appropriate to impart the desired surface finish to the product, which temperature lies within the range above which there would be decomposition of the plastic or deformation of the extruded product and below which the mouldability of the extruding mass would be impaired.

The temperature of the die tip in relation to the speed of travel of the extruded material may be sufficiently high to melt the surface of the extruding product but insufficiently high to cause either decomposition of the plastic or deformation of the extruded product whereby a high gloss finish is imparted to the product.

The invention also includes extrusion apparatus comprising a two component or two zone extrusion die whereof the temperatures are independently adjustable. The two components or two zones may be separated by a thermal insulating barrier to retard the transfer of heat between the body of the die and the die tip. Cooling means, e. g. a cooling jacket, may be provided for the lower temperature section of a two zone die.

The invention can be applied with particular advantage to heat-sensitive compositions which tend to decompose on heating. These compositions include those based on the chlorine-containing polymers such as polyvinyl chloride, polyvinylidene chloride and polymonochlorotrifluoroethylene (known as fluorothene) and their copolymers but it may be used with thermoplastic materials in general for example with cellulose acetate, polyethylene and polystyrene.

A wide range of extruded sections may be formed by the application of this invention. Thus, for example, rods, tubes, strips and angles may be formed and it is also applicable to the production of electrical conductors coated with thermoplastic material.

A further advantage of this invention is that a single extrusion composition may be used for preparing extruded sections having a variety of surface finishes whereas previously it has been necessary to employ a number of differently constituted compositions in order to produce the same range. The invention may also be applied to the production of extruded products having varying surface finishes e. g. to the production of a tube in which the outer surface is polished and the inner surface is matt.

Following is a description by way of example and with reference to the accompanying drawings of apparatus for carrying out the present invention.

In the drawing:

Figure 1 is a diagrammatic view, partly in central longitudinal section of an extruder.

Figure 2 is a longitudinal section on a larger scale than Figure 1 of a die for extruding rod section.

Figure 3 is an end view of the die of Figure 2 showing the arrangements of the heaters.

Referring to the three figures of the drawing in which similar parts are denoted by similar reference numerals 10 is the barrel of the extruder fitted with an extruder screw 11 for forcing plastic material fed to it from the hopper 12 through the breaker plate 13, constituted by a perforated metal disc, through the die 14. The die 14 is secured to the barrel of the extruder by the screwthreaded die holder 15.

The die consists of a mild steel truncated cone 16, a die tip 17 and a thermally insulating section 18 made e. g. of asbestos cement board or similar material which thermally insulates the tip 17 from the cone 16.

The barrel is heated by means of heaters 19 and 20 heating the feed and head zones of the barrel respectively. The die is heated by means of heaters 21 and 22 heating the main body of the die and the die tip respectively.

Referring particularly to Figures 1 and 2, the die holder 15 is screwthreaded at 23 for attachment at the end of the extruder barrel 10, the die tip 17 and the insulating section 18 are secured to the truncated cone 16 by means of screws 24 and 25.

The truncated cone 16 and the insulating section 18 form the plastic stream into roughly the dimensions of the extruded section. The tip 17 has a short lead-in 26 and parallel land 27 to form the plastic stream to the required dimensions.

The tip and the insulating section may be fastened together so that they may be replaced as a unit by a different tip.

The heaters 21 and 22 are electric heaters of the cuff type and may be thermostatically controlled.

Following are examples of the extrusion of plastic materials employing the apparatus described above. All the parts are parts by weight.

Example I

This example describes the extrusion with the use of apparatus as described above of a thermoplastic composition having a basis of polyvinyl chloride in the preparation of extruded products having (a) high gloss and (b) matt finishes respectively.

An extrusion composition was prepared by mixing, fluxing and grinding in the usual manner the following materials:

| | Parts |
|---|---|
| Polyvinyl chloride | 100 |
| Chlorinated paraffin | 35 |
| Dibutyl phthalate | 35 |
| Lead carbonate | 4 |
| Litharge | 2 |
| Ethyl palmitate | 2 |
| Carbon black | 1 |

The composition was then used in the extrusion of articles having different surface characteristics as under:

(a) The extrusion of articles having a high gloss surface finish.

The composition was charged to the hopper 12 of an extruder of usual design in which the composition passes from the hopper 12 into the extruder barrel 10, the feed zone of which is maintained by heater 19 at 90° C. The composition is then progressively advanced through the barrel 10 by the extruder screw 11 (the diameter of the screw is 2" and it runs at a speed of 35 R. P. M.) to the head zone which is maintained at 140° C. by a heater 20. From the barrel the composition is forced through a breaker plate 13 (consisting of a perforated metal disc) to the extruder die 14, first to the low temperature zone (maintained at approximately 155° C. by an electric cuff heater 21) in which initial shape is imparted to the moulding and then, to the die tip which imparts final shape and which is heated by an electric cuff heater 22 to a temperature (approximately 270° C.) which is sufficiently high to melt the surface of the plastic and thus to impart the requisite gloss finish to the extruded article but insufficiently high to cause either decomposition of the plastic or substantial softening of the extruded article.

(b) The extrusion of articles having a matt surface finish. The extrudable composition as used in (a) above was charged into an extruder of the type described above. The conditions of heating were the same as under (a) except that the die tip was heated to 105° C. only. The material passing through the die tip remained sufficiently warm to assume the shape of the tip but the surfaces in contact with the die tip walls were cooled and a uniform matt finish was imparted to the extruded article.

Example II

This example describes the extrusion of an unplasticised copolymer of vinyl chloride and vinyl acetate in the preparation of products having a glossy or a matt surface.

An extrusion composition was prepared by mixing, fluxing and grinding the following materials:

| | Parts |
|---|---|
| Copolymer of vinyl chloride (90% by weight) and vinyl acetate (10% by weight) | 96.5 |
| Dibutyl tin dilaurate | 2.5 |
| Dehydrated castor oil | 1.0 |

The resulting composition was charged to an extruder of the type described in Example I in which the temperature conditions were as follows:

| | °C. |
|---|---|
| Feed zone | 40 |
| Barrel | 145 to 150 |
| Body of die | 150 |

For a product having a high gloss finish the die tip was adjusted to a temperature of 210 to 235° C. and for a matt finish the die tip temperature was adjusted to the range 125 to 140° C.

Example III

This example describes the extrusion of plasticised copolymer of vinyl chloride and vinyl acetate.

An extrusion composition was prepared by mixing, fluxing and grinding the following materials:

| | Parts |
|---|---|
| Copolymer of vinyl chloride (97% by weight) and vinyl acetate (3% by weight) | 63.5 |
| Dioctyl phthalate | 33.0 |
| Basic lead carbonate | 3.0 |
| Calcium stearate | 0.5 |

The resulting composition was charged to an extruder of the type described in Example I maintaining the following temperature conditions:

| | °C. |
|---|---|
| Feed zone | 40 |
| Barrel | 140 to 155 |
| Body of die | 155 |

For a product having a high gloss finish the die tip was adjusted to 200 to 240° C. and for a product having a matt finish the temperature of the die tip was reduced to 120 to 140° C.

Example IV

A polyethylene extrusion compound was charged to the hopper of an extruder of the type indicated in Example I. The various parts of the extruder were maintained under the following temperature conditions:

| | °C. |
|---|---|
| Feed zone | 20 |
| Head zone | 125 |
| Body of the die | 135 |

The screw temperature was maintained at 10° C. by cooling and the speed at 28 R. P. M. For a product having a high gloss finish the die tip temperature was regulated to 240 to 280° C. and for a matt finish the die tip temperature was regulated to 90 to 110° C.

I claim:

1. Process of extruding a thermoplastic composition and imparting to the surface of the extruding composition a desired finish ranging from a gloss to a matt finish, which comprises heating the composition to a plastic moulding consistency, introducing the thus heated composition to an extrusion die having two different temperature zones separated by a thermally insulating section, namely a temperature zone in the body of the die effective to maintain the moulding consistency of the composition, and a second temperature zone at the die tip effective to impart a different temperature to the surface of the composition as it is shaped by being extruded therethrough, successively moving the heated composition through the die body to impart an initial shaped to the composition and then through the die tip to impart the final shape to the composition at a rate of movement to retain the core of the extruding composition substantially at moulding consistency while the surface temperature of the extruding composition is changed by the temperature zone of the die tip to a temperature imparting the desired surface finish, which surface temperature lies within a range below which the mouldability of the extruding mass is impaired and above which range decomposition or deformation of the thermoplastic occurs.

2. Process of extruding a thermoplastic composition and imparting to the surface of the extruding composition a matt finish, which comprises heating the composition to a plastic moulding consistency, introducing the thus heated composition to an extrusion die having two different temperature zones separated by a thermally insulating section, namely a temperature zone in the body of the die effective to maintain the moulding consistency of the composition, and a second temperature zone at the die tip effective in cooling the surface of the composition being extruded therethrough, successively moving the composition through the die body to impart an initial shape to the composition and then through the die tip to impart the final shape to the composition at a rate of movement to retain the core of the extruding composition at a plastic consistency while cooling the surface of the extruding composition sufficiently to impart a matt finish by means of the temperature zone of the die tip.

3. A method as claimed in claim 1 wherein the die tip is heated to a temperature which in relation to the speed of travel of the extruding product is sufficiently high to melt the surface of the extruding product but insufficiently high to cause either decomposition of the plastic or deformation of the extruded product whereby a high gloss finish is imparted to the product.

4. A method as claimed in claim 1 wherein the thermoplastic composition comprises a heat-sensitive plastic compound selected from the group consisting of the polymers and copolymers of vinyl chloride, vinylidene chloride or monochlorotrifluoroethylene.

References Cited in the file of this patent

UNITED STATES PATENTS

| | | |
|---|---|---|
| 1,397,087 | Davidson | Nov. 15, 1921 |
| 1,800,180 | Day | Apr. 7, 1931 |
| 1,904,884 | Royle | Apr. 18, 1933 |
| 2,117,179 | Kopp | May 10, 1938 |
| 2,245,640 | Beattie | June 17, 1941 |
| 2,366,417 | MacMillin | Jan. 2, 1945 |
| 2,477,170 | Broderson et al. | July 26, 1949 |
| 2,541,201 | Buecken et al. | Feb. 13, 1951 |
| 2,547,151 | Braeseke | Apr. 3, 1951 |